May 23, 1961 O. L. PATTERSON 2,985,372

APPARATUS FOR PROVIDING VARIABLE IMPEDANCES

Original Filed July 30, 1951

2 Sheets-Sheet 1

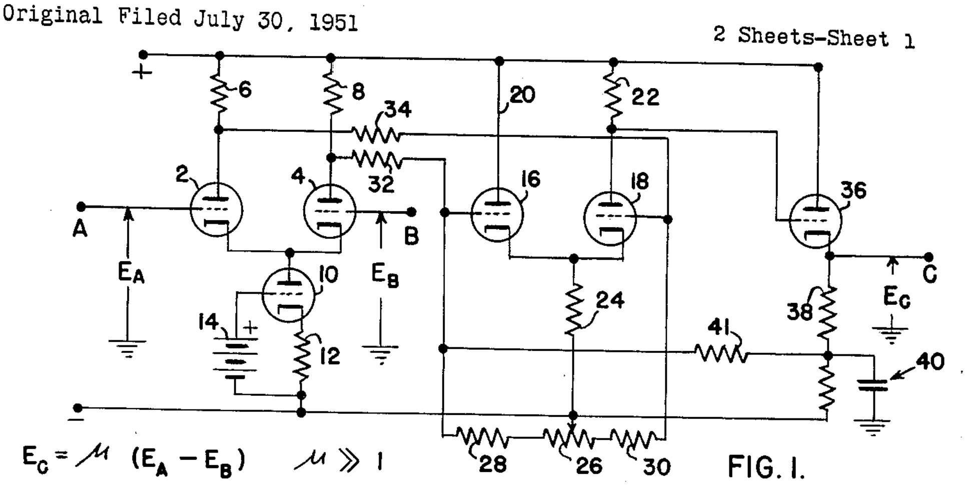

$$E_C = \mu (E_A - E_B) \qquad \mu \gg 1$$

FIG. 1.

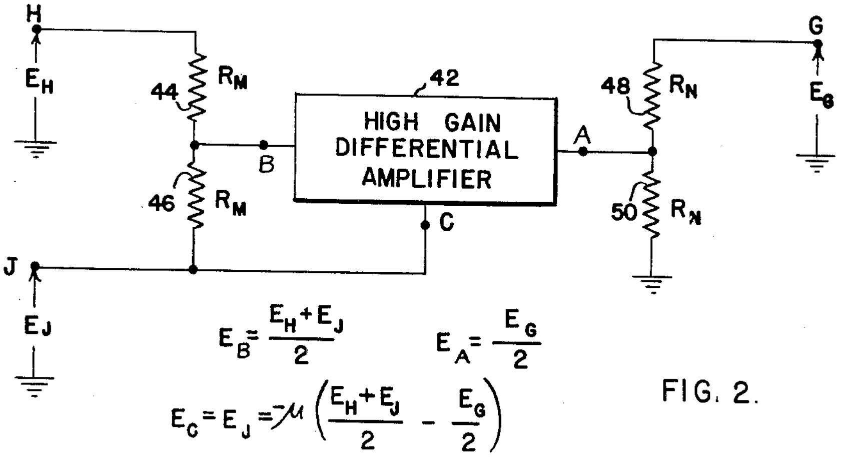

$$E_B = \frac{E_H + E_J}{2} \qquad E_A = \frac{E_G}{2}$$

FIG. 2.

$$E_C = E_J = \mu \left( \frac{E_H + E_J}{2} - \frac{E_G}{2} \right)$$

$$E_J = \frac{\mu}{\mu + 2} (E_G - E_H) \longrightarrow E_G - E_H$$

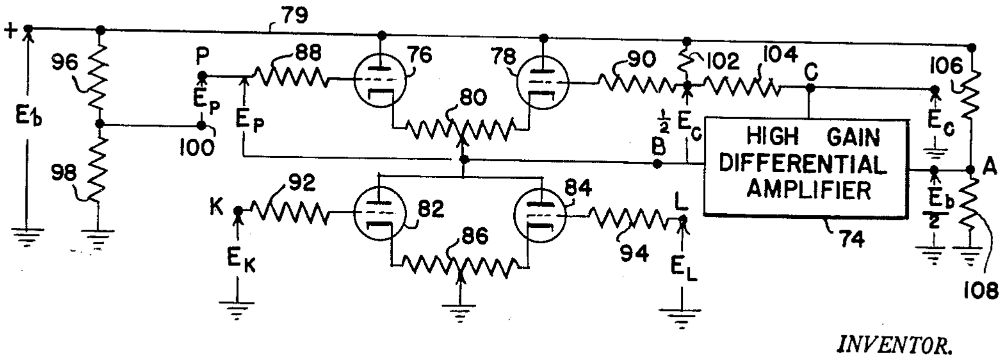

$$\frac{E_C}{2} \cdot E_P = E_K \cdot E_L$$

FIG. 3.

INVENTOR.

OMAR L. PATTERSON

BY Busser, Smith & Harding

ATTORNEYS

APPARATUS FOR PROVIDING VARIABLE IMPEDANCES

Original Filed July 30, 1951

INVENTOR.
OMAR L. PATTERSON
BY
Busser, Smith & Harding
ATTORNEYS

United States Patent Office 2,985,372

Patented May 23, 1961

2,985,372

APPARATUS FOR PROVIDING VARIABLE IMPEDANCES

Omar L. Patterson, Media, Pa., assignor to Sun Oil Company, Philadelphia, Pa., a corporation of New Jersey Original application July 30, 1951, Ser. No. 239,279. Divided and this application Sept. 22, 1952, Ser. No. 310,902

4 Claims. (Cl. 235—184)

This invention relates to computing circuits and has particular reference to the provision of circuits for providing variable impedances.

This application is a division of my prior application Serial No. 239,279, filed July 30, 1951 (Patent No. 2,855,145). Reference may also be made to my prior applications Serial Nos. 130,270 (Patent No. 2,727,682) and 196,480 (Patent No. 2,788,938), filed respectively November 30, 1949 and November 18, 1950. The present application is in part a continuation of said application Serial No. 196,480.

One of the objects of the present invention is the provision of an impedance which may be controlled as a function of a potential or of time so as to vary in accordance with the output of a function generator. More particularly, there is provided a functional capacitance or an arrangement in which a charge may be functionally varied in dependence on an independent variable represented by a potential.

A further object of the invention is the provision of variable impedances of high value. In particular, in accordance with this phase of the invention, there may be provided continuously variable capacitances of high capacity values far exceeding those obtainable with mechanically variable condensers.

These and other objects of the invention, particularly relating to details of construction and operation, will become apparent from the following description read in conjunction with the accompanying drawings, in which:

Figure 1 is a wiring diagram of a high gain differential amplifier used to form an element of the circuits provided in accordance with the invention;

Figure 2 is a diagram showing a high accuracy subtraction circuit involving the use of the high gain differential amplifier of Figure 1;

Figure 3 is a multiplication and division circuit utilizing the high gain differential amplifier of Figure 1 and used in the circuits provided in accordance with the present invention;

Figure 4:
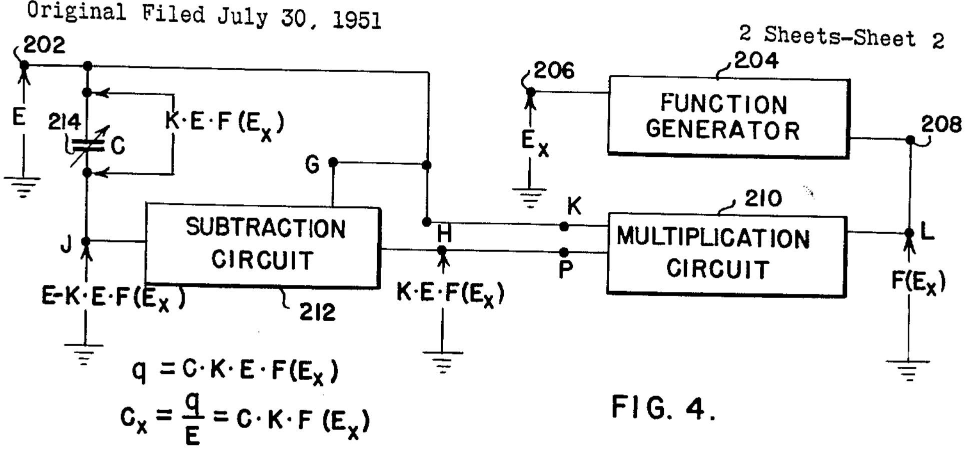
Figure 4 is a diagram showing the construction of a circuit which provides an impedance varying as the function of an independent variable or, alternatively, which may be used for the provision of a charge varying as the function of an independent variable.

In accordance with the invention there is utilized a high gain differential amplifier providing high accuracy of circuits of computing type in which it is incorporated and independence of tube characteristics. Such a differential amplifier will first be described.

A preferred form of high gain differential amplifier is illustrated in Figure 1 and is of the type described in "Vacuum Tube Amplifiers," volume 18, Radiation Laboratory Series, page 485, McGraw-Hill, 1948. It will be noted that this differential amplifier is, in many respects, similar to that disclosed in my application, Serial No. 196,480. It involves an improvement thereover in the provision of a constant current triode.

A pair of triodes 2 and 4 have their grids connected to the input terminals A and B. These triodes are provided with anode load resistors 6 and 8 and their cathodes are connected together and to the anode of a triode 10 arranged in a cathode follower circuit, there being provided the cathode load resistor 12. A battery 14 or other source of fixed potential is connected between the remote end of the cathode resistor 12 and the grid of triode 10.

The grids of a pair of triodes 16 and 18 are respectively connected through resistances 32 and 34 to the anodes of triodes 4 and 2. The anode of triode 16 is connected directly to the positive potential supply line. The anode of triode 18 is connected to the same supply line through a load resistor 22. The cathodes of triodes 16 and 18 are connected to each other and to a common cathode load resistor 24 which is, in turn, connected to a negative potential supply line. To this line there is also connected the contact of a potentiometer 26 which is connected respectively through resistances 28 and 30 to the grids of triodes 16 and 18. An output triode 36 is connected in a cathode follower circuit, its cathode being connected to the negative potential supply line through a resistor 38 and a resistance-capacitance network indicated at 40. Feedback is provided through resistance 41 to the grid of triode 16. The grid of triode 36 is connected to the anode of triode 18 and the anode of triode 36 is connected to the positive potential supply line. The output terminal C is connected to the cathode of triode 36.

With a balancing adjustment properly made at potentiometer 26, the action of this differential amplifier is to provide at the output terminal C a potential $E_C$ which is related to the input potentials at terminals A and B, namely $E_A$ and $E_B$ in accordance with the expression given below the circuit diagram in Figure 1. By virtue of the amplification which is provided in the circuit, the constant $\mu$ has a value greatly exceeding unity and, in fact, with a proper choice of circuit constants, this factor may have a value as high as 10,000.

In the case of the differential amplifier circuit illustrated and described in said Patterson application, Serial No. 196,480, the cathodes of the triodes corresponding to 2 and 4 are connected to the negative supply line through a resistor. When such a connection is made, the expression of $E_C$ contains an additional term involving the sum of the potentials $E_A$ and $E_B$. This common mode of these potentials is substantially completely eliminated by the provision of the triode 10 and its connections in place of a fixed resistance, the action of this triode being to provide a constant total current from the cathodes of triodes 2 and 4. As will be evident, this constant current condition results from the fact that the cathode potential of triode 10 with respect to the lower end of resistor 12 is maintained substantially constant by the provision of the battery 14, the positive terminal of which is connected to the grid of triode 10. It will be evident, therefore, that if the triodes 2 and 4 are similar in their characteristics, as they desirably should be, a simultaneous change of potential of the grids of both in the same sense and amount will result in no change of the currents through the load resistors 6 and 8 and, consequently, no output signals to the grids of the triodes 16 and 18. When, therefore, the triodes 2 and 4 are similar to each other and the triodes 16 and 18 are also similar to each other, and minor differences are subjected to substantial elimination by adjustment at potentiometer 26, the expression given below the circuit diagram holds to a high degree of accuracy and the output potential is extremely sensitive to differences between the input potentials. As will appear hereafter, this condition may be utilized in securing a high precision of equality between various potentials, in view of the high value of the factor $\mu$. The high numerical value of this factor may be also utilized to secure ratios, as will appear hereafter, which are very nearly equal to unity.

A highly important feature of the differential amplifier as a basic computer element, especially for long time operation, is mutual cancellation of effects of heater voltage variation and "aging" of tube characteristics.

In one embodiment of the present invention there is utilized a subtraction circuit which will now be described.

In this subtraction circuit the high gain differential amplifier of Figure 1 is indicated at 42, its terminals A, B and C being indicated in Figure 2 to correspond with those in Figure 1. The terminal B is connected to the junction of a pair of resistors 44 and 46 which initially may be considered to have the same resistance value $R_M$. The terminal A is similarly connected to the junction of a pair of resistors 48 and 50 which may also be assumed to have the same resistance value $R_N$. The upper end of resistor 48 is connected to a terminal G, while the lower end of resistor 50 is grounded. The upper end of resistor 44 is connected to a terminal H, while the lower end of resistor 46 is connected both to the terminal C and an output terminal J. Terminals G and H constitute input terminals for the subtraction circuit. That the output potential $E_J$ appearing at terminal J is very precisely equal to the difference of the input potentials $E_G$ and $E_H$ appearing at terminals G and H will be evident from consideration of the expressions given below the circuit diagram in Figure 2. When the value of $\mu$ is very large, as previously described, it will be evident that the fractional factor involved in the last line of the expressions is very nearly equal to unity. Accordingly, an output potential is provided which is substantially equal to the difference of the input potentials. It will be evident that, even though the value of $\mu$ may vary from one high gain differential amplifier to another, or during the use of an amplifier because of changes in tube characteristics, the subtraction circuit output is highly independent of any such variations of operating characteristics of the differential amplifier. The circuit is also capable of handling a very wide range of both positive and negative potentials.

In particular, it is to be noted that this subtraction circuit does not involve any additive term derived from tube potentials or other source as do subtraction circuits heretofore known. This fact is particularly important in uses of the subtraction circuit for integration or differentiation.

One embodiment of the present invention utilizes a multiplication circuit which will now be described with particular reference to Figure 3, the high gain differential amplifier of Figure 1 being indicated at 74.

A pair of triodes 76 and 78 have their anodes connected to a positive potential supply line 79 the potential of which will be designated $E_b$. The cathodes of these triodes are connected to the ends of the resistance of a potentiometer 80, the contact of which is connected to the anodes of the triodes 82 and 84 of a second pair, the cathodes of which are connected to the ends of a potentiometer 86, the contact of which is grounded. Equal resistances 88, 90, 92 and 94 are connected to the grids of the respective triodes and join them to various terminals. These resistances should have quite large resistance values, for example, ten megohms. The resistance 88 connects the grid of triode 76 to a terminal P. The resistance 92 connects the grid of triode 82 to a terminal K. The resistance 94 connects the grid of triode 84 to a terminal L.

A pair of equal resistances 96 and 98 connect the positive supply line 79 to ground to provide at a terminal 100 a potential which is one-half the potential of the positive supply line. A pair of equal resistances 102 and 104 connect the positive potential supply line 79 to the terminal C of the high gain differential amplifier 74. The junction of resistances 102 and 104 is connected to the grid of triode 78 through the high resistance 90. Terminal B of the differential amplifier is connected to the contact of potentiometer 80. Terminal A of the differential amplifier is connected to the junction of equal resistances 106 and 108 which are connected between the positive supply line 79 and ground to provide at their junction a potential equal to one-half the potential of the supply line.

The triodes 76, 78, 82 and 84 are desirably of the same type and of closely similar characteristics. The resistances involved at potentiometers 80 and 86 are small and the grids of the triodes are either slightly positive or negative with respect to their cathodes under operating conditions depending upon the tube type used. As is known, for low absolute values of potential of a grid with respect to the cathode for which grid current flows and for low grid current, an exponential relationship between the grid current and grid-cathode potential exists. If each of the grid input resistors is large, as stated above, and each effective cathode resistor is small, it may be readily seen that the grid-cathode potential of each of the triodes is, to a good degree of accuracy, proportional to the logarithm of the input potential plus a constant dependent almost solely on the grid input resistance.

As will be evident from the circuit arrangement, the sum of the current flowing through the triodes 76 and 78 is equal to the sum of the currents flowing through the triodes 82 and 84. Assuming first identical characteristics of the triodes and location of the potentiometer contacts at the centers of resistances 80 and 86, and assuming further equality of resistances at 80 and 86, it will be noted that the function of the differential amplifier 74 is to maintain at terminal B the fixed potential which exists at terminal A and which is one-half the potential of the positive supply line. The differential amplifier enforces this condition by providing at terminal C a control of the potential of the grid of triode 78. The potential to ground existing at the junction of the equal resistances 102 and 104 will be noted to be one-half the potential to ground appearing at the terminal C plus one-half the potential of the positive supply line above ground. Accordingly, the potential which is enforced between the junction of resistances 102 and 104 and terminal B of the differential amplifier is one-half the potential at terminal C. Noting that the effective input potential $E_p$ at terminal P is referred to terminal 100 which in turn is one-half the potential of the positive supply line above ground, it will be evident that the enforced conditions are as given in the equation below the circuit diagram of Figure 3, i.e., the product of the effective input potentials to the triodes 76 and 78 is equal to the product of the input potentials to the triodes 82 and 84. What are referred to as the effective input potentials to triodes 76 and 78 are, of course, the potentials measured above the datum furnished by the terminal 100 and terminal B of the differential amplifier. The result is, accordingly, that terminal C provides an output which is proportional, with a factor of 2, to the product of the potentials $E_K$ and $E_L$, divided by the potential $E_P$.

It will be noted that in the foregoing circuit the plate voltages are held substantially constant and furthermore the sum of the currents through the upper triode pair is always equal to the sum of the currents through the lower triode pair. Consequently, both the upper and lower pairs are operating under substantially identical conditions of input potential products. A change of heater voltage or drift in tube characteristics tends to cancel out. Reference was made above to the use of triodes of substantially identical characteristics. While this is desirable, it is not essential and the adjustments at potentiometers at 80 and 86 may be made to take care of differences in the tubes and in addition may be used to provide adjustment of exponents of the factors.

While only two tubes are illustrated in Figure 3 in each of the upper and lower groups, it will be evident that, if desired, additional tubes may be arranged in parallel with these to provide additional factors appearing in either the numerator or denominator of the value of the output potential, or in both. Thus, the quotient of any number of factors may be provided. Desirably, however, the number of tubes used should be equal in the upper and lower groups to provide substantially identical operating characteristics; but, obviously, this introduces no difficulty inasmuch as any one or more of the tubes may have a constant potential input which will then appear merely as a scale factor in the result.

The circuit of Figure 3 is particularly desirable for multiplication in which case $E_P$ will be merely a constant potential and will appear as a scale factor in the result.

In accordance with the present invention there is provided, utilizing the circuits described above, a circuit adapted for the production of a "functional capacitance," i.e., a capacitance which varies as a given function of a variable and which may be, for example, time or some arbitrary or scheduled potential. Use for such a capacitance arise at times in the matter of formulation of analogs. The capacitance thus required may be either positive or negative or may well vary between positive and negative values. A circuit of this type is illustrated in Figure 4.

At 202 there is indicated a terminal between which and ground the functional capacitance is to be provided. At 204 there is indicated a function generator which may be of one of the types described in Patterson application, Serial No. 188,291, filed October 4, 1950, or in Patterson and Yetter application, Serial No. 239,278 (Patent No. 2,793,320), filed July 30, 1951. As pointed out in said applications, an input potential $E_X$ which may be assumed applied to a terminal 206 will give rise at an output terminal, indicated at 208, to a potential which is some arbitrary predetermined function of the potential $E_X$ which output is here designated as $F(E_X)$. The output potential at 208 is delivered to the terminal L of a multiplication circuit 210 such as that of Figure 3, the other two terminals K and P of which are indicated. To the terminal K there is delivered the potential E from the terminal 202.

The output terminal P of the multiplication circuit 210 delivers to the input terminal H of the subtraction circuit 212 of the type illustrated in Figure 2 a potential as indicated in Figure 4 which is a product of the potential E and the functional potential from the function generator multiplied by a constant K which is, of course, subject to adjustment. To the terminal G of the subtraction circuit the potential E is applied from the terminal 202 with the resulting output at J of the difference potential as indicated in Figure 4. Between the terminals 202 and J there is connected the physical capacitance 214 having a value C and, in many cases, desirably adjustable.

The two equations following the diagram in Figure 4 indicate the nature of the derivation of the apparent capacitance between terminal 202 and ground. The first equation gives the charge which exists on the condenser 214, this charge being the product of the actual capacity of this condenser and the potential between its terminals. The apparent capacity between terminal 202 and ground $C_x$ is then given by the quotient of this value of $q$ and the potential E between the terminal 202 and ground and it will be evident that this apparent capacity is the product of C and K with the function generated by the function generator. C and K, both or either of which may be adjustable, merely determine the scale factor involved. It will be evident that the function may be applied negatively to the terminal L and, consequently, the apparent capacitance may be either positive or negative. Even more generally, the function may vary through zero in which case the apparent capacitance may also vary through zero. In this connection, it should be noted that, generally speaking, it is the dynamic value of such capacitance which is of interest so that no loss of generality of result is occasioned by the addition of constant potentials such as may be required to provide a range through zero of operation of the circuit components.

Sometimes, there is required rather than a functional capacitance a "functional charge," that is, a charge appearing between terminals which varies as a function of some variable for example either time or some potential which may be dependent upon some other variable. Such a functional charge may be readily obtained by what amounts to a simplification of the circuit illustrated in Figure 4 by omission of the multiplication circuit and the delivery from terminal 208 of the function generator directly to terminal H of the subtraction circuit of the function which is generated by the generator. In such case it will be evident that the apparent charge appearing between terminal 202 and ground will be that of the first expression below the circuit of Figure 4 with the value of E equal to unity. A positive sense of charge is thus secured. However, if instead of the subtraction circuit, there is provided an addition circuit of any of the various known types, then the value of the charge $q$ will be numerically the same but of negative sign.

It will be further evident that special cases of function generation will give rise to particular types of apparent capacitances of special utility. $E_x$ may, for example, well be E, in which case the capacitance (or charge) may be an arbitrary function of E. In this case, of course, the multiplication circuit may well be omitted, the output of the function generator being applied directly to terminal H of the subtraction circuit. But the subtraction circuit may also be omitted if a suitable function is generated, so that, still more simply, the function generator may have its output connected directly to the lower terminal of condenser 214. Such connection will generally involve a cathode follower type of amplifier of low output impedance such as described hereafter.

It may also be noted that while a capacitance is indicated at 214, this is merely representative of a general impedance which may be quite arbitrary, being, for example, a resistance, inductance, any combination of resistance and reactance elements, a transmission line having lumped or distributed parameters, or the like. In general, such an impedance may be made functionally dependent upon a potential.

Of particular importance, however, is a circuit capable of providing a continuously variable capacitance of high capacity value. Structural size seriously limits the capacity of variable condensers. But occasions arise where large variable capacities are called for and the best that could heretofore be provided involved the use of sets of condensers selectively switched to provide steps of change. In accordance with the present invention there may be provided a continuously variable capacitance of high capacity value.

Involved as an element of such capacitance is, desirably, a cathode follower of low output impedance which will now be described.

Figure 5:
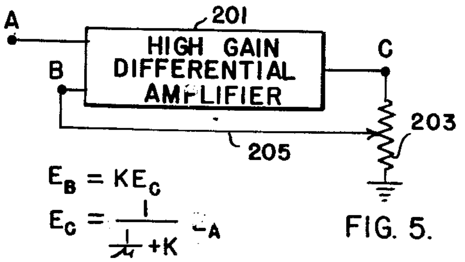
Figure 5 is a diagram showing a cathode follower circuit having very low output impedance and utilizing a high gain differential amplifier of the type illustrated in Figure 1.

A high gain differential amplifier of the type shown in Figure 1 is indicated at 201 in Figure 5. The terminal C is connected to ground through the resistance 203 of a potentiometer, the adjustable contact of which is connected at 205 to terminal B. The result is to apply at terminal B a potential which is K times that at C, K being equal to or less than unity. It will be evident that for an input at A there will be provided at C an output given by the second equation of Figure 5. If $\mu$ is large, as described above, K is substantially the factor of proportionality, being unity if terminal C is directly connected to terminal B.

The advantages of this circuit lie in its extremely low output impedance and its high degree of independence of tube characteristics. For these reasons it is of general utility; for example, it may be used to drive low impedance devices, such as speaker coils without the use of a transformer.

Furthermore, it may be noted that the circuit in Figure 5 provides a high precision linear amplifier having a definite gain set by the value of K which depends only on the values of the resistances appearing above and below the potentiometer contact. These resistances may be accurately fixed by the use of precision resistors joined to a terminal replacing the potentiometer contact.

Figure 6:
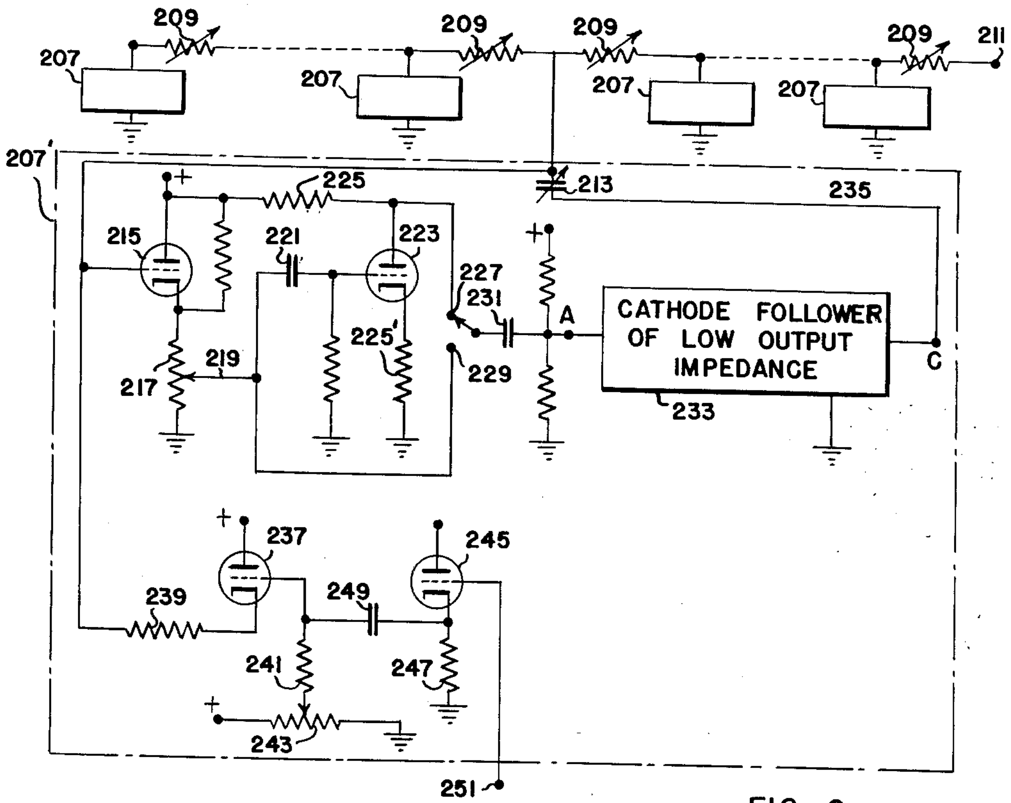
Figure 6 is a diagram showing a water drive network suitable for use in an oil reservoir analyzer and specifically incorporating means providing continuously variable capacitances of high value.

The arrangement for providing a variable capacitance is illustrated in Figure 6 embodied in a water drive analog the utilization of which is more fully described in my application Serial No. 196,480. Said application illustrates and describes a variable capacitance arrangement which is similar to that about to be described except for the difference involved in the cathode follower portion of the circuit.

The water drive analog comprises a series of resistances 209, the junctions of which are connected to ground through capacity elements which are indicated at 207. In view of the fact that these capacity elements require a wide range of adjustment and relatively high capacity values, there are used in this network dynamic capacity elements which are similar to each other so that only one of these is detailed at 207', it being understood that all of the individual elements 207 are constructed as illustrated at 207'. The resistances 209 of the network are shown as variable but, in practice, there are preferably used, instead of continuously variable resistors, sets of resistors which are chosen into the circuit by switching. In the same fashion, the condenser 213 is shown as variable but since these condensers 213 are of relatively large capacity values in the particular use here illustrated, it is preferable in actual practice to utilize groups of fixed condensers which are selectively switched into the circuit. It is also generally desirable to provide resistance anud capacity units which may, as a whole, be switched into and out of the circuit. However, such details are arbitrary and are not illustrated. Generally, for good reproduction of an actual water drive network, a considerable number of network sections is involved. There may, for example, be fifteen or more of these sections, and the multiplicity is indicated by the use of dotted lines in the showing of the network.

Referring now particularly to the capacitance element indicated at 207' (which also includes a charging arrangement), it will be noted that each such element comprises a condenser 213 connected to the corresponding junction between resistances 209 of a pair. The value of the capacity provided by the condenser 213 may be alternatively divided or multiplied. The range for each condenser, for example, may be from about one-tenth to about fifty times its capacity value and it will be evident, therefore, that by the use of a limited number of interchangeable condensers, a very large range of capacities may be provided. As will appear, the adjustments of capacity are continuous. It is not necessary in practice to have the resistances of the network continuously variable so that a reasonable number of fixed resistances may be provided and switched into the circuit as indicated above.

The upper terminal of the condenser 213 is connected to the grid of a triode 215 in a cathode follower arrangement, there being provided between the cathode and ground a potentiometer resistance 217 associated with a variable contact 219. This variable contact arrangement provides between the contact 219 and ground a potential varying from approximately the value of the potential between the grid and ground to some limiting fraction thereof as, for example, one-tenth the value of the grid potential. A condenser 221 connects the contact 219 to the grid of an amplifying triode 223. This triode is associated with an anode load resistor 225 and the cathode is connected to ground through a cathode resistor 225'. The amplification of the amplifier just described may be set by a proper choice of the cathode resistor 225'. This amplification may vary, for example, from unity to about fifty. The anode of triode 223 is connected to a contact 227 engageable by a switch arm which is alternatively engageable with contact 229 connected to the potentiometer contact 219.

Considering the arrangement so far described, assume that the switch engages contact 229. It will then be evident that at the switch there will appear a potential which may vary from approximately the value of the potential of the grid of triode 215 to some small fraction thereof depending upon adjustment of potentiometer contact 219. Division of the potential appearing at the grid of triode 215 is thus effected, the potential of the switch being of the same sign as that of the grid. On the other hand, if the switch engages contact 227 the output at the potentiometer contact 219 is amplified to the degree afforded by the amplifier including triode 223 and the potential appearing at the switch will be of a sign opposite that appearing at the grid of triode 215, or, in other words, the phase of the input is reversed. In short, considering both adjustments of the switch, the inphase output of the arrangement may be any chosen fraction of the input or, alternatively, the out-of phase value of the output may be either a fraction or a multiple of the input. As will be evident from consideration of the use of the network being described in an analog, a repetition cycle is involved so that only alternating signals need be considered, these being delivered from the switch through condenser 231.

A cathode follower of low output impedance is illustrated at 233 and may be of the type shown and described with reference to Figure 5. Alternatively, for many purposes, it is sufficient to use a cathode follower of less accurate type and of somewhat higher output impedance such as described in my application, Serial No. 196,480. Considering, however, that the cathode follower at 233 is of the type illustrated in Figure 5, the condenser 231 provides its output to terminal A and the cathode follower output at terminal C is connected through line 235 to the lower terminal of condenser 213.

The cathode follower provides a very accurate correspondence of input to output potential irrespective of output current drain by reason of its low output impedance. The condenser 213 constitutes a load on the cathode follower circuit and it is very important that the output should be linearly related to a high degree of accuracy to the input in order that the effective dynamic capacity will be constant irrespective of the charges or currents which are involved. This last result cannot be secured to a sufficient degree of accuracy with an ordinary cathode follower and, hence, there is used the cathode follower circuit of Figure 5 or such a cathode follower circuit as is described in said prior application Serial No. 196,480.

That the arrangement above described constitutes a continuously variable condenser may now be made clear. If the switch engages contact 229, the potential fed to the lower terminal of condenser 213 will be of the same sign as the potential fed to the upper terminal of this condenser so that there will appear across the condenser 213 a potential which is some fraction of the potential between its upper terminal and ground. Accordingly, there is secured an effective capacity having a fraction of the capacity of the condenser 213, the value of this fraction being determined by the setting of potentiometer contact 219 and being continuously variable with the continuous variation of this contact. On the other hand, consider the switch in engagement with contact 227. There is then applied to the lower terminal of the condenser 213 a potential which is of opposite phase with respect to the potential applied to the upper terminal of this condenser and this potential applied to the lower terminal may be either a fraction or a multiple of the potential applied to the upper terminal depending upon the choice of resistance 225′ and the setting of the potentiometer contact 219. Accordingly, the potential across the condenser will exceed the potential of its upper terminal with respect to ground and this potential across the condenser will be continuously variable with adjustment of contact 219. In view of this, it will be evident that the system provides what amounts to a multiplication of the capacity appearing between the upper terminal of condenser 213 and ground as compared with the physical capacity of the chosen condenser at 213.

The dynamic capacity afforded by the arrangement just described is of quite general applicability. The potentiometer in the cathode circuit of triode 215 may be directly calibrated in terms of continuous variations of capacitance and, in view of the fact that a large condenser of high grade and small leakage, for example, of the order of two microfarads or more, may be provided at 213, it will be evident that there may be provided an adjustable capacitance which may have an effective capacity of the order of several hundred microfarads. Such a dynamic capacitance may be used, for example, for filtering. Furthermore, in view of the inherent negative feedback involved, there is a very low effective series resistance so that, when used as a filter, low impedance filtering will not be impaired.

This is in contrast with the normal difficulty of securing high capacitances without leakage and, of course, of securing continuous variability of capacitances of high value.

The remaining portion of the appratus indicated at 207′ has to do with the initial charging of the capacitances in the network prior to a zero time of the repetitive cycle of an analyzer or analog such as described in said application, Serial No. 196,480.

The charging is effected through a triode indicated at 237 which has its cathode connected through resistance 239 to the upper terminal of condenser 213. The grid of triode 237 is connected through resistance 241 to the contact of a potentiometer 243 which is connected between the positive potential supply line and ground. The grid of triode 237 is connected through condenser 249 to the cathode of a triode 245 in a cathode follower arrangement including the cathode load resistor 247. The grid of triode 245 is connected to a terminal 251 which, as will appear from said application Serial No. 196,480, is connected to a source of positive square waves of a timing circuit, the applied wave having a duration, for example, of 2000 microseconds in a preferred arrangement of the apparatus.

In view of the presence of condenser 249, it will be evident that the grid of triode 237 is subjected to a potential which varies as a square wave about a constant potential set by the position of the contact on potentiometer 243. The square wave is of accurately regulated amplitude and it will be evident that during the positive cycles of this wave the potential at the grid will be positive so that the triode 237 will be conducting and will charge the condenser 213, or rather the effective dynamic capacitance which has been described, to a potential at its upper terminal with respect to ground corresponding to the sum of the potential of the potentiometer contact and half the complete amplitude of the square wave, the current carrying capacity of triode 237 being sufficient to permit full charging during the positive half cycle of the square wave. On the other hand, during the negative half cycle of the square wave, the grid of triode 237 will be driven to cut off and the network will then deliver current through the withdrawal circuit of the type described in said prior application.

While the elements including and to the right of condenser 249 are indicated as repeated in each of the assemblies 207′, in practice, such repetition is unnecessary and this portion of the circuit may be provided only once for a group of the assemblies 207′. In such case, the triode 245 must be provided with adequate current carrying capacity and, to this end, the single triode indicated at 245 may be replaced by two or more triodes connected in parallel.

The terminal 211 is the output terminal of the network and is connected as described in said application, Serial No. 196,480.

It will be evident that various changes may be made in the embodiment of the invention without departing from the scope thereof as defined in the following claims.

What is claimed is:

1. Apparatus for providing an effective impedance between a pair of terminals varying as the function of a predetermined signal comprising a physical impedance having a terminal connected to one of said pair of terminals, and means providing between the other of said pair of terminals and another terminal of said impedance a potential varying with said signal, said means including a subtraction circuit having first and second input terminals and a third output terminal and operative to produce at said third terminal a potential approximately equal to the difference of potential between the first terminal and the second terminal, said first terminal of the subtraction circuit being connected to the first mentioned of said pair of terminals, and said second terminal of the subtraction circuit receiving a potential varying with said signal, the third terminal of said subtraction circuit providing the first mentioned potential.

2. Apparatus for providing an effective impedance between a pair of terminals varying as the function of a predetermined signal comprising a physical impedance having a terminal connected to one of said pair of terminals, and means providing between the other of said pair of terminals and another terminal of said impedance a potential varying with said signal, said means including a function generator and a subtraction circuit having first and second input terminals and a third output terminal and operative to produce at said third terminal a potential approximately equal to the difference of potential between the first terminal and the second terminal, said first terminal of the subtraction circuit being connected to the first mentioned of said pair of terminals, and said second terminal of the subtraction circuit receiving a potential from said function generator varying with said signal, the third terminal of said subtraction circuit providing the first mentioned potential.

3. Apparatus for providing an effective impedance between a pair of terminals varying as the function of a predetermined signal comprising a physical impedance having a terminal connected to one of said pair of terminals, and means providing between the other of said pair of terminals and another terminal of said impedance a potential varying with said signal, said means including a function generator, a multiplication circuit having two input terminals and an output product terminal and a subtraction circuit having first and second input terminals and a third output terminal and operative to produce at said third terminal a potential approximately equal to the difference of potential between the first terminal and the second terminal, said first terminal of the subtraction circuit being connected to the first mentioned of said pair of terminals, and said second terminal of the subtraction circuit receiving a potential from said output product terminal varying with said signal, the third terminal of said subtraction circuit providing the first mentioned potential, said multiplication circuit having one input terminal receiving the output of said function generator, and having its other input terminal connected to the first mentioned of said pair of terminals.

4. Apparatus for providing an effective impedance between a pair of terminals varying as the function of a predetermined signal, which signal is independent of the potential between said terminals, comprising a physical impedance having a terminal connected to one of said pair of terminals, and means including a function generator providing between the other of said pair of terminals and another terminal of said impedance a potential given substantially by $E-K \cdot E \cdot F(E_x)$ wherein E is the potential between the first mentioned terminals, K is a constant, and $F(E_x)$ is a function of said signal.

References Cited in the file of this patent

UNITED STATES PATENTS

| | | |
|---|---|---|
| 2,078,792 | Fitz Gerald | Apr. 27, 1937 |
| 2,423,754 | Bruce | July 8, 1947 |
| 2,472,464 | Bruce | June 7, 1949 |
| 2,721,908 | Moe | Oct. 25, 1955 |
| 2,728,524 | Neher | Dec. 27, 1955 |

OTHER REFERENCES

Elements of D.C. Analog Computers, G. A. Korn, "Electronics," April 1948, pages 122–127.

Electronic Instruments (Greenwood, Holdam and MacRae), published by McGraw-Hill Book Co., New York, 1948, pages 56 and 81 relied on.

Linear Electronic Analog Computer Design, Meneley and Morrill, "Proceedings of the National Electronics Conference," vol. 5, 1950, pages 48–63.